United States Patent [19]

Savit

[11] 3,990,036
[45] Nov. 2, 1976

[54] MULTIPLEXING METHOD AND APPARATUS FOR TELEMETRY OF SEISMIC DATA

[75] Inventor: Carl H. Savit, Houston, Tex.

[73] Assignee: Western Geophysical Co., Houston, Tex.

[22] Filed: Feb. 28, 1974

[21] Appl. No.: 446,862

[52] U.S. Cl. ............... 340/15.5 TS; 179/15 AL; 340/147 SY; 340/151; 340/152 R
[51] Int. Cl.² .................................. G01V 1/22
[58] Field of Search ....... 340/15.5 TS, 151, 147 SY, 340/152 R, 413; 179/15 AL; 343/178, 179; 178/58 R

[56] References Cited
UNITED STATES PATENTS

| | | | |
|---|---|---|---|
| 2,406,165 | 8/1946 | Schroeder | 179/15 AL |
| 2,651,677 | 9/1953 | Lair | 179/15 AL |
| 2,723,309 | 11/1955 | Lair et al. | 179/15 AL |
| 3,601,543 | 8/1971 | Maniere | 179/15 AL |
| 3,652,979 | 3/1972 | Angelle | 340/15.5 TS |
| 3,723,971 | 3/1973 | Betts et al. | 179/15 AL |
| 3,748,638 | 7/1973 | Montgomery, Jr. et al. | 340/15.5 TS |
| 3,824,545 | 7/1974 | Brenner et al. | 340/151 |
| 3,851,302 | 11/1974 | Schmitt | 340/15.5 CP |

*Primary Examiner*—Howard A. Birmiel
*Attorney, Agent, or Firm*—William A. Knox

[57] ABSTRACT

A single time-multiplexed channel for telemetry of seismic data from a plurality of remote, spaced-apart sensors to a central recording device. All of the sensors are identical and interchangeable. A unique polling signal is transmitted over a telemetry link to each sensor. Upon receipt of the polling signal, each sensor in turn transmits its accumulated data over the telemetry link to a recording device. The time-delay due to polling-signal propagation between successive sensors provides a time window during which each sensor can transmit data.

9 Claims, 2 Drawing Figures

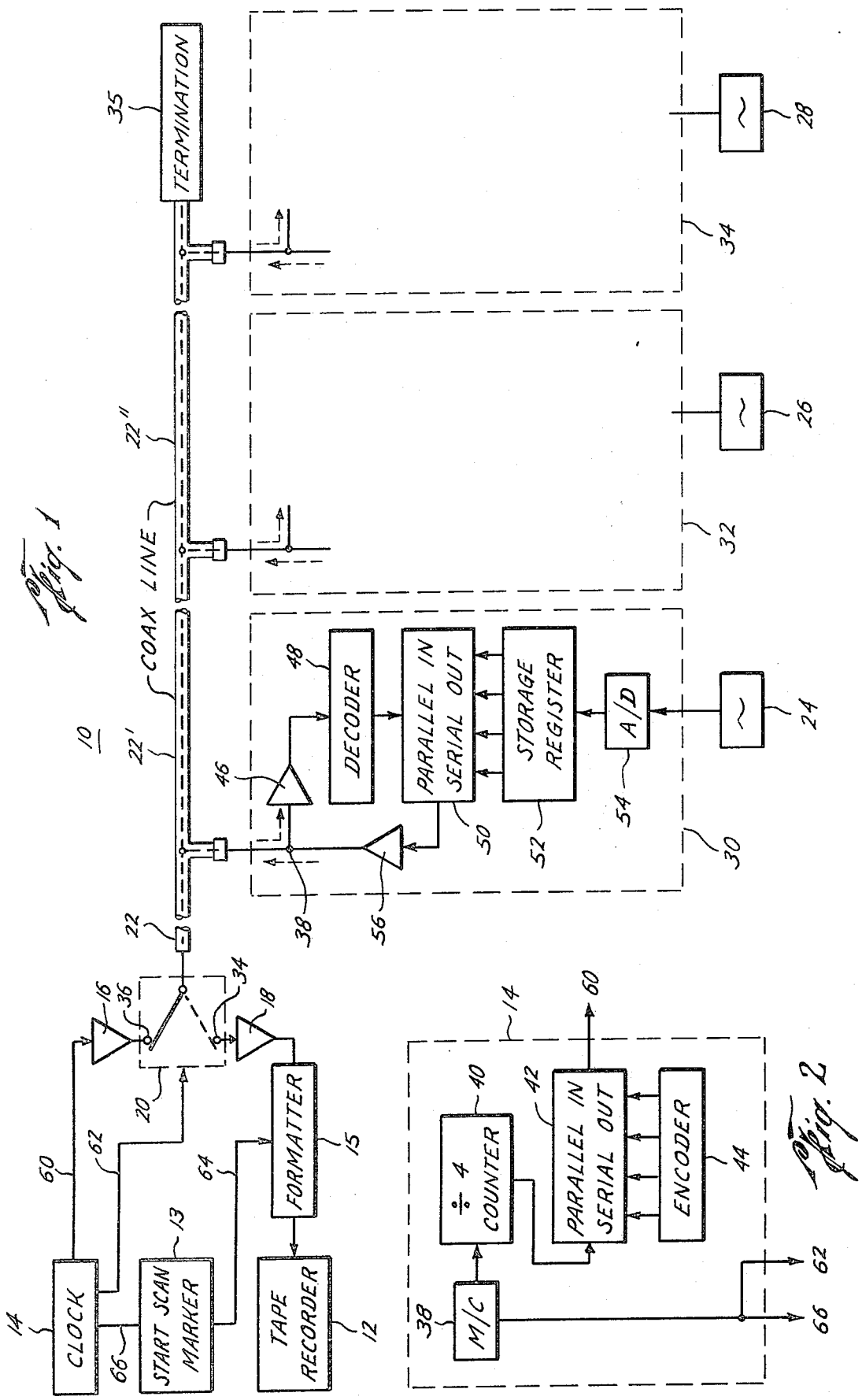

MULTIPLEXING METHOD AND APPARATUS FOR TELEMETRY OF SEISMIC DATA

BACKGROUND OF THE INVENTION

1. Field of the Invention

This invention relates to the art of telemetry as applied particularly to seismographic exploration.

2. Related Prior Art

In seismic exploration, acoustic signals are injected into the earth from a location at or near the surface thereof. The acoustic signals radiate downwardly and are reflected from subsurface formations. The reflected acoustic signals return to the earth's surface where they are detected by a plurality of seismic sensors or sensor groups. The sensors are usually deployed along an assigned line and are spaced tens or hundreds of feet apart. Up to one hundred or more sensors or sensor groups may be distributed over such a line, which may be three miles long.

The detected reflected acoustic signals are transmitted to a central signal-recording system. In accordance with conventional seismographic surveying practice, the sensors are located along the assigned line at increasingly greater distances from the recording system. There is therefore a nearest and a farthest sensor or sensor group relative to the recording system.

Commonly, the plurality of seismic sensors transmit data to the recording system through a like number of physically separate transmission channels. Each channel is scanned according to a predetermined sequence. Because of the high cost of a large number of individual transmission channels, single-channel, time-multiplexed telemetry systems have been proposed, wherein the recording system polls each sensor in sequence and identifies each individual sensor by an address unique to that sensor. Alternatively, various clocking schemes have been proposed whereby each sensor has a unique response to one or more clocking signals emitted by the recording system.

The known telemetry systems are characterized in that each sensor unit must, in some specific manner, be unique and distinguishable from its companion sensors on a per-channel basis. Additionally, in the case of multichannel sensors or arrays, a switching system must be used to change channel assignments as the various sensors are advanced in accordance with the so-called common-depth-point seismic exploration method.

If each one of a large number of sensors must be identified uniquely, there is the possibility of confusion in sensor identification attendant when replacing lost or defective sensors or when changing array configurations.

It would be very advantageous, to avoid confusion, if all seismic sensors or sensor groups were identical and interchangeable.

It is an object of this invention to provide a telemetry system having one time-shared or time-multiplexed channel adapted to transmit signals from a plurality of identical, interchangeable sensors or sensor groups to a signal-recording device.

SUMMARY OF THE INVENTION

Each sensor is equipped with a switching means and a signalling means for communicating with the recording system through a high-capacity transmission channel such as a microwave channel, a shielded twisted pair of conductors, or a coaxial transmission line. The switching and signaling means is adapted to transmit a digital data message comprising a fixed number of data bits into the transmission channel in response to a unique interrogation or polling signal received from the recording system. Each sensor is polled in sequence as the polling signal propagates along the transmission line from the recording system. The propagation delay time between successive sensors is made to have sufficient duration so as to permit transmission of the digital message from the first sensor before the next sensor, in line, is polled and its transmitted signal reaches the first sensor. The digital polling signal and the digital data message are distinct. All sensors respond, in turn, to the polling signal, and no sensor responds to the digital data message from another sensor.

BRIEF DESCRIPTION OF THE DRAWINGS

FIG. 1 is a schematic diagram of a preferred embodiment of my telemetry system; and FIG. 2 is a schematic diagram of the system's multiplexer clock shown in FIG. 1.

DETAILED DESCRIPTION OF THE INVENTION

FIG. 1 illustrates schematically a multi-sensor, party-line, telemetry system, generally shown as 10. Telemetry system 10 comprises a data receiving-and-recording system, or tape recorder 12, a formatter 15, a clock 14, a line-driver 16, line receiver 18, high-speed switch 20, and a multi-segment transmission link, having segments 22, 22', 22'', etc., and a transmission-line termination network 35.

Connected to transmission link 22 are a plurality of seismic sensors 24, 26, 28, etc., with associated data-ports, generally shown in dotted boxes 30, 32, 34. In FIG. 1, three seismic sensors and data ports are shown, but it is to be understood that up to 100 or more such sensors may be employed. Similarly, although only one seismic sensor is shown connected to each data-port, a seismic sensor group of two or more sensors may be connected to each port. Data-port 30 may be an integral part of the seismic sensor 24 to form a complete seismic sensor package.

The object of the telemetry system is to fetch, upon command by the recorder 12, a digital data-sample from each seismic sensor in turn, and to record the sample in a prescribed sequential order in a storage medium such as a computer memory or a magnetic tape. The time required to poll all of the sensors and to record the data samples derived therefrom constitutes one scancycle which is controlled by clock 14. A scancycle may be activated, for example, as often as every 40 $\mu$s or as infrequently as every 4 or 8 ms, depending on requirements and conditions of particular apparatus or problems, as will be described more fully hereinbelow.

In the initial condition at the beginning of the scancycle, switch 20 is actuated to upper contact 36, thereby connecting transmission line 22 with the clock 14. At the same time, seismic data samples are acquired and stored in digital form in data-ports 30, 32, 34. At the start of the scan-cycle, a unique digital polling signal is injected into the transmission line 22. The polling signal is a serial bit-stream having a unique format. Alternatively, the polling signal may be transmitted in a separate channel independent of the data transmission line. Immediately after injection of the polling signal, switch 20 is actuated to lower contact 38, thereby connecting recorder 12 with transmission line 22 through formatter 15, and simultaneously a start-scan mark (SSM) is sent to recorder 12.

The polling signal propagates along transmission link 22 and consecutively commands each of data-ports 30, 32 and 34 to transmit digital data-samples back to recorder 12. The propagation delay of the polling signal between successive data-ports is sufficient to allow transmission of the last bit of a data-sample from the previously activated data-port, before the arrival of the first bit of the digital data-sample from the data-port next in line.

There must be at least one bit-time separation between the two data samples. The digital data-samples consist of a single bit or a serial bit stream whose format is distinguishable from the polling signal. Thus all data-ports recognize the same polling signal, but no data-port recognizes the signal representing a datasample. In the alternative embodiment in which the polling signal is transmitted on a separate line, no special coding or identification logic is required. Clock 14 starts a scan-cycle by encoding and transmitting a unique polling signal consisting of a serial bit stream having a prescribed format.

Referring now to FIG. 2, clock 14 may consist of a master clock 38, a divide-by-four counter 40, a parallel-in, serial-out shift register 42, and an encoder 44. Encoder 44 transmits a unique digital polling signal in parallel to a shift register 42, which may be a high-speed shift register such as the Signetics 8274 parallel-in, serial-out shift register.

Upon receipt of a start-scan signal from master clock 38, divide-by-four counter 40 serially strobes the bits of the polling signal into line driver 16 over line 60 and thence to transmission line 22. Following transmission of the polling signal, switch 20 is opened by a pulse through line 62 and a SSM is sent to recorder 12 over line 64. In this example it has been assumed that the polling signal consists of four bits. If, for example, ten bits were employed, counter 40 would be a divide-by-ten counter such as Signetics No. 74192 counter.

Transmission line 22 is shown as a coaxial cable but it may also consist of a shielded, twistedpair transmission line or a microwave link. In conventional seismic exploration practice, sensors 24, 26, and 28 are typically spaced apart 200 to 350 feet. To match properly the output of clock 14 with transmission line 22, the line driver 16, such as a Fairchild 75110 line driver, is required.

For simplicity, switch 20 is illustrated symbolically as a two-position mechanical switch. In a preferred embodiment, switch 20 would employ high-speed Schottky logic of a type well-known to the electronics art.

Data port 30 includes a line receiver 46, decoder 48, parallel-in, serial-out shift register 50, a storage register 52, analog-to-digital (A/D) converter 54, and a line driver 56. During its idle portion of a scan-cycle, seismic sensor 24 acquires an analog signal which is sampled and converted to a digital number by A/D converter 54. The digital number is a numerical representation of the analog signal level at the time of sampling and digitization. The digital number is defined as a data sample or a data word. The output from A/D converter 54 is stored in storage register 52, while data port 30 is awaiting its turn to transmit a digital data-sample. The unique polling signal is detected by line receiver 46 and is identified by decoder 48. Upon recognition of the polling signal, decoder 48 triggers shift register 50.

When triggered, shift register 50 accepts in parallel the predetermined number of bits from the digital number resident in storage register 52 for transmission in serial order to line driver 56, and thence for subsequent transmission to recorder 12. Line receiver 46 may, for example, be a Fairchild 75107/108 line receiver.

As data port 30 is triggered by the polling signal, the data sample is transmitted from line driver 56 through switch 20 to line receiver 18, which may also be, for example, a Fairchild 75107/108 line receiver. From line receiver 18, the data sample is stored for assembly into bytes by formatter 15 for subsequent magnetic tape recording by recorder 12. The remaining data ports, 32, 34, etc., are polled in turn as the polling signal propagates along transmission line segments 22′, 22″ to complete the scan-cycle.

Transmission line 22 is terminated by the termination network 35 which may be of any type well known to the electronics art to prevent undesired reflections of polling and data signals. At the end of each cycle, clock 14 reinitializes switch 20 and a new scan cycle is commenced. Additional scan-cycles are reinitialized throughout the duration of the seismic recording.

The duration of each data-sample transmission is short and of fixed length. It should be less, by a suitable separation interval, than the propagation time for a signal in the transmission-line segment over a distance equal to the minimum sensor separation. The separation interval should be at least one bit time plus the uncertainty of the signal propagation time between sensors. Let the minimum distance between sensors be, for example, 200 feet, and assume a propagation velocity of 2.0 ns/ft. The allowable duration of data transmission would then be about 750 ns after allowance for two-way propagation time between sensors and a 50 ns data-sample separation.

The number of data-bits transmitted by a data port in response to a polling signal is determined by the permissible data-bit transmission rate and by the two-way propagation time over one sensor interval. If the data-bit transmission rate is greater than or equal to the number of bits in one data sample divided by the separation interval, the recording system may be a standard multi-channel system which emits one polling signal at each scan-cycle or sample interval. With the advent of modern high-speed memories and ligic components, switching times of a few nanoseconds per bit are now feasible and practical. Alternatively, delay circuitry may be inserted in each section of the transmission line, or in the case of a separate polling line, in each section of the polling line to provide additional time for data transmission from each sensor or sensor group.

Typically a commonly-used seismic array of sensors or sensor groups is not longer than about 10,000 feet. If a signal propagation in a coaxial cable typically takes about 2.0 ns per foot, the round trip time for a signal to traverse such a cable will be about 40,000 ns or 40 $\mu$ s. That is, from the time the polling signal is emitted until the last data sample is received, a period of 40 $\mu$ s elapses. Thus twenty-five such polling signals could be emitted and the corresponding data sample signals be received each millisecond. Since typical seismic signals are easily contained in 21 or 22 bits, it is perfectly feasible, using the present invention, to build the telemetry system in such a way that each sensor transmits exactly one bit of its stored sample value for each polling signal. The principal advantage of such a procedure is that the highest signal frequency which must be transmitted through the channel (or cable) is thereby minimized, a one-bit data sample being transmitted every 750 ns in the sensor system described hereinabove in which the spacing between sensors is 200 feet. Such a transmission corresponds to a frequency of 1.3 MHz, well within the capability of relatively inexpensive coaxial cables and state-of-the-art digital logic components.

If, as in the above example, the data bits transmitted in response to the polling signal are less than the total number of bits in the data sample, a plurality of polling signals must be transmitted to the data ports for each data word. In FIG. 1, formatter 15 will necessarily include assembly registers and additional logic to assemble partial data samples into a data word suitable for recording.

While this invention has been described with particular application to seismic exploration, it is not necessarily restricted thereto, as will be apparent to those skilled in the art.

What is claimed is:

1. A telemetry system for transmission of data words from at least two remote seismic sensors to a central recording system through a single transmission channel, there being a nearest and a farthest sensor, said system comprising:
    first means, including: logic, storage, and switching means, coupled with each remote sensor, said storage means being adapted to store data from said remote sensor;
    second means, including: receiving, signaling and logic means, coupled with said central recording system;
    said transmission channel interconnecting said first and second means;
    means in each remote sensor for receiving a polling signal transmitted through said transmission channel from said second means after a time delay determined by the signal propagation velocity through said transmission channel and means responsive to said polling signal for transmitting data from each said remote sensor in sequence through said transmission channel to said central recording system; and
    said logic, storage, and switching means within each first means being substantially identical and interchangable without adjustment.

2. A method of sampling the output data from a plurality of sensors wherein each sensor is positioned in a preassigned sequence, the sensors being substantially identical so that they can be interchangeable without affecting the sampling thereof;
    transmitting a polling signal, all sensors being responsive to the same polling signal, which, because of the spatial arrangement of the sensors, reaches the sensors at predetermined intervals in accordance with the signal propagation velocity through a transmission channel due to their respective distances to the transmitter of the polling signal; and
    identifying as to the sensor of origin the data words transmitted by the respective sensors and received at a central recording station in accordance with the times elapsed from the transmission of the polling signal to the reception of the data words from the sensors at the central station.

3. A system for telemetering seismic data signals over a signal transmission link comprising:
    A signal receiving means interconnected with said transmission link, said signal receiving means being adapted (1) to transmit a digital polling signal into a first transmission channel, and (2) to receive seismic data words from a second transmission channel at desired sample time intervals;
    A plurality of seismic sensor units positioned remotely from said signal receiving means and being so disposed that there is a nearest and a farthest sensor unit;
    decoding means for receiving and decoding said polling signal from said first transmission channel and in response thereto for transmitting at least a portion of a seismic data word from said seismic sensor units through said second transmission channel to said signal receiving means, the duration of transmission from each sensor unit being less than the propagation delay time of the polling signal between consecutive sensor units plus the delay time of signals between consecutive sensor units, and plus the time duration of the polling signal; and
    said decoding means being interconnected with said seismic sensor units and said first and second transmission channels.

4. The system of claim 3 wherein said sensor unit and said decoding means are substantially identical without adjustment among said plurality of sensor units.

5. The system of claim 4 wherein the portion of the seismic data word length is less than the smallest two-way propagation time between any two consecutive seismic sensor units.

6. The system of claim 3 wherein said first and said second transmission channels constitute one channel.

7. The system of claim 6 wherein the duration of transmission from each sensor unit is less than the two-way propagation delay time of signals between consecutive sensor units plus the time duration of the polling signal.

8. The system of claim 7 wherein said sensor unit and said decoding means are substantially identical among said plurality of sensor units.

9. The system of claim 8 wherein the portion of the seismic data word length is less than the smallest two-way propagation time between any two consecutive seismic sensor units.

* * * * *